UNITED STATES PATENT OFFICE.

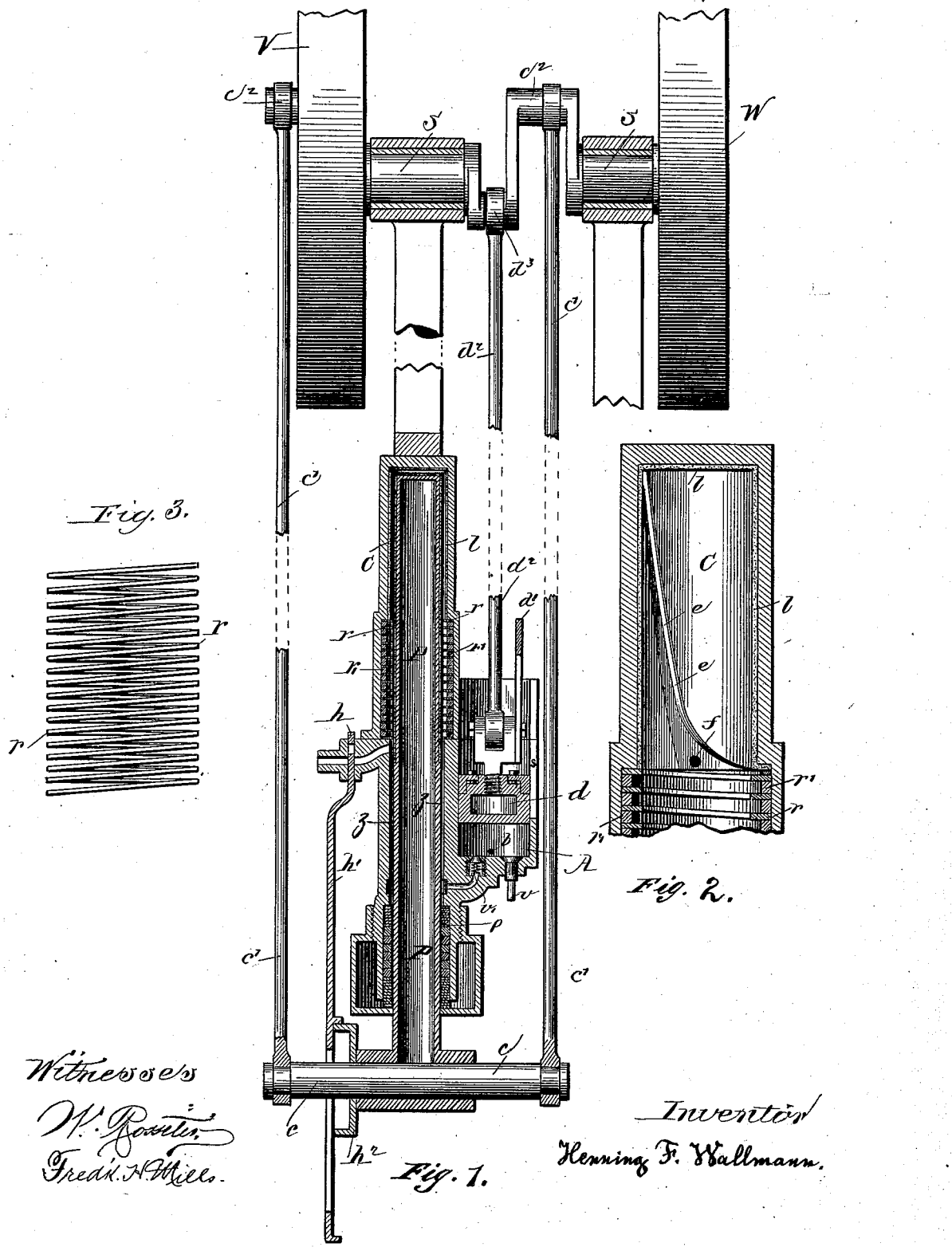

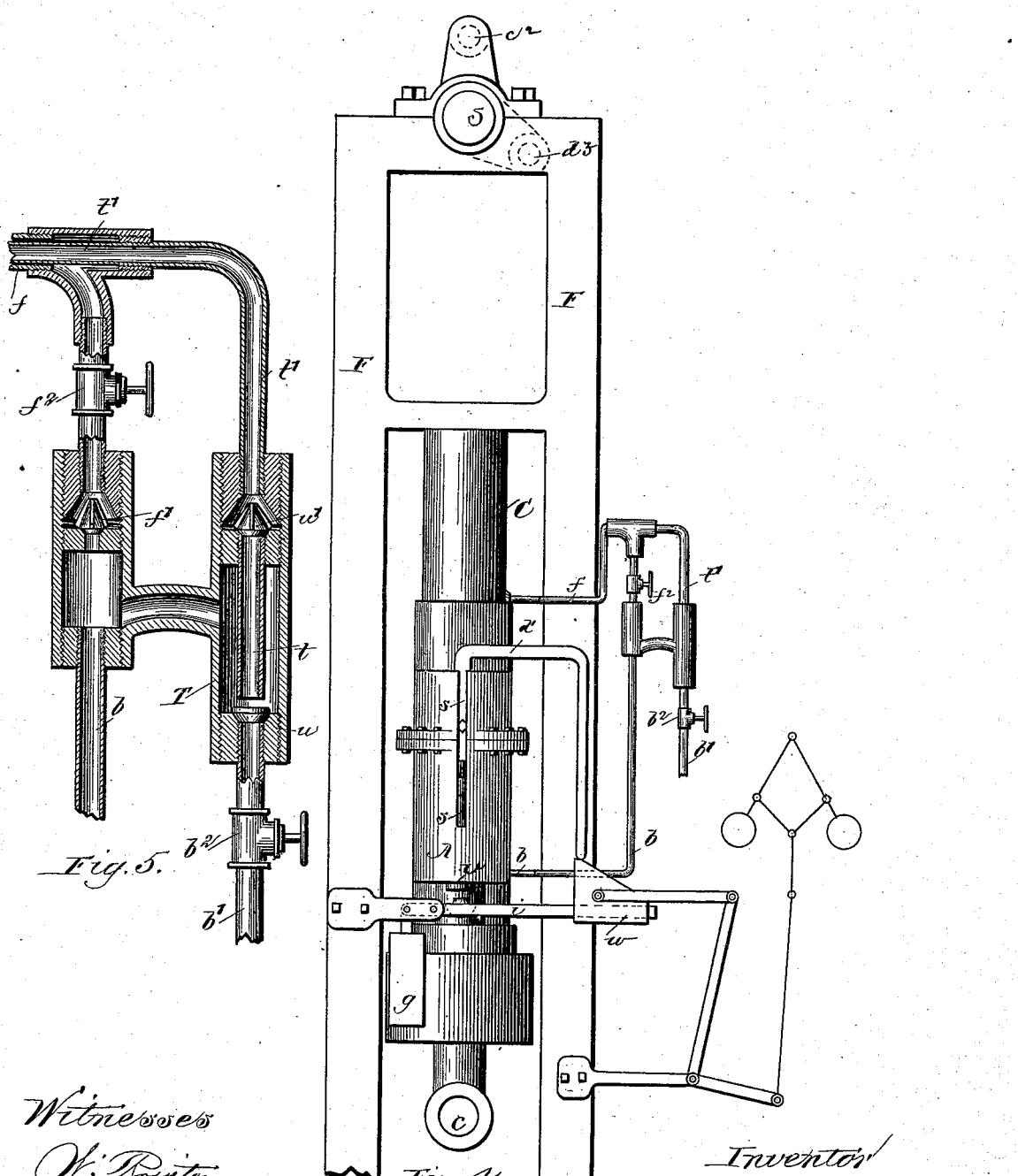

HENNING FRIEDRICH WALLMANN, OF CHICAGO, ILLINOIS.

PETROLEUM OR GAS MOTOR.

SPECIFICATION forming part of Letters Patent No. 548,824, dated October 29, 1895.

Application filed October 28, 1889. Serial No. 328,490. (No model.)

*To all whom it may concern:*

Be it known that I, HENNING FRIEDRICH WALLMANN, a subject of the Emperor of Germany, residing at Chicago, in the county of Cook and State of Illinois, have invented new and useful Improvements in Petroleum or Gas Motors, of which the following is a specification.

My invention relates to improvements in motors, in which only one part of the combustion-cylinder is used as a combustion-chamber for the combustion of any kind of fuel, especially hydrocarbons in solid, liquid, or gaseous form; and the objects of my improvements are, first, to have the combustion-cylinder constructed in such a way as will allow those parts of cylinder and piston forming and inclosing the combustion-chamber to attain as high a degree of temperature as is consistent with the nature of the material of which the cylinder and piston are made; second, to use cold air for separating and protecting the lubricated parts of the cylinder and piston, especially the packing of the piston, from the hot gases in the combustion-chamber; third, to provide the combustion-cylinder with an improved and more effective regenerator; fourth, to line those parts of the cylinder and piston forming and inclosing the combustion-chamber with some fireproof material, preferably with a heavy coating of flint enamel; fifth, to regulate the speed of the engine in a simple and economical way; sixth, to introduce liquid fuel—say petroleum—into the combustion-chamber by means of a simple apparatus; seventh, to arrange all the parts of the engine within the smallest possible space. I attain these objects by the mechanism illustrated in the accompanying drawings, in which—

Figure 1 is a vertical section of the entire machine. Fig. 2 is an enlarged section of that part of the cylinder forming the combustion-chamber. Fig. 3 is a detail of the regenerator. Fig. 4 is a side view of the main body of the motor, showing the arrangement for regulating the speed, and Fig. 5 is a section of the enlarged apparatus for introducing the liquid fuel into the combustion-chamber.

Similar letters refer to similar parts throughout the several views.

A frame F supports the combustion-cylinder C and the crank-shaft S, carrying the flywheel W and the pulley V. Within the cylinder C and the packing $p$ moves the plunger-piston P, connected by means of the cross-head $c$ and the two connecting-rods or pitmen $c'$ to the cranks $c^2 c^2$ of the crank-shaft S. The piston P is so prolonged that only a relatively-short part moves within the packing $p$. That part of the piston remaining always within the cylinder C and not coming into contact with the packing $p$ is lined with enamel $l$, just as is a smaller or greater part of the inner surface of the cylinder C, especially that part of it forming and inclosing the combustion-chamber near its closed end. Between the prolonged piston P and the inner surface of the cylinder C, near the packing $p$, is an annular space $z$, filled with cold air, and farther removed from the packing $p$ between said prolonged piston P and the inner surface of said cylinder C is a regenerator consisting of coiled tracks, which preferably may be formed out of strips $r$ and $r'$.

The inlet $f$ for the fuel opens into a groove or channel $e$ cut into the inner surface of the cylinder C. The groove $e$ is so shaped as to form an easy passage-way from or into the regenerator. An air inlet and an exhaust opening for the expanded gases lead, respectively, into and out of the annular space $z$ and are placed, respectively, near the packing of the piston and near the regenerator. The exhaust-opening is provided with a slide $h$ on a rod $h'$, and the cross-head $c$ carries a cam $h^2$ for moving the slide $h$ and thereby opening or closing the exhaust-pipe whenever the piston P arrives at one or the other end of its stroke.

A is an air-pump, its piston $d$ being connected by the pitman $d^2$ to the crank $d^3$ of the crank-shaft S. The relative position of the cranks $d^3$ and $c^2$ is shown in Fig. 4. $v$ is the valve for the suction, and $v'$ the valve for the delivery, of the air. The greater part of the cylinder A of the air-pump is only used as a guide for the piston $d$, and this part of the cylinder may be provided with a slot $s$, forming a free passage for the air. Only the rest of the cylinder A near its closed end is used for compressing and delivering air into the combustion-cylinder C. The air-pump A communicates by means of the pipe $b$ with the apparatus for introducing liquid fuel into the combustion-cylinder.

$u$ is the suction-valve; $u'$, the discharge-valve; $b'$, the suction-pipe for the petroleum, and $b^2$ a valve for letting on or cutting off the supply of petroleum by hand.

Within the vessel T is the pipe $t$ for delivering the petroleum through the valve $u'$ and the pipe $t'$ into the pipe $f$, surrounding one part of the pipe $t'$. Air may be delivered through the valves $f'$ and $f^2$ into the space between the pipes $t'$ and $f$, which air will come in contact with the petroleum at the end of the pipe $t'$ and be used for the ignition of the petroleum. By means of the valve $f'$ the current of air may be stopped or let on at will.

A weight $g$ tends to keep open the valve $v$ by means of the lever $i$, carrying a sliding triangle or inclined plane $w$, being in proper connection with the governor. Whenever it is necessary to press air into the combustion-cylinder C, a bracket $d'$, being fastened to the piston of the air-pump, pushes on the triangle $w$, thereby raising the weight $g$ and allowing the valve $v$ to close.

The operation of the engine is as follows: The gases from the last stroke being just discharged, the combustion-cylinder C has to receive a new charge of air and fuel, say petroleum. The space within the vessel T surrounding the pipe $t$ is partly filled with petroleum. The suction-valve $v$ of the air-pump and the exhaust-valve $h$ of the combustion-cylinder are closed, and the piston $d$ moves down into the cylinder A and presses the inclosed air through the valve $v'$ into the annular space $z$ between the prolonged piston P and inner surface of the cylinder C. At the same time air goes from the air-pump through the pipe $b$ and presses the petroleum within the vessel T through the pipe $t$, valve $u'$, and pipes $t'$ and $f$ into the groove $e$ of the combustion-cylinder C. At the same time the piston P begins to move out of the cylinder C, thereby forming a combustion-chamber near the closed end of the cylinder. The air, after passing through the annular space $z$ and after separating and protecting the packing and the lubricated parts of the piston P and cylinder C from the hot air and gases within the regenerator and the combustion-chamber, goes into the regenerator and becomes heated itself by circumflowing several times the piston P. From the regenerator the air goes into the groove $e$ and comes here in contact with the fuel, which is at the same time introduced into the groove $e$ by the inlet $f$. The air promotes combustion of the fuel partly within the groove $e$ and the rest within the combustion-chamber near the closed end of the cylinder C. After the piston $d$ has arrived at the end of its stroke the hot expanding gases within the combustion-cylinder C press on the piston P until its stroke is finished and the discharge-valve $h$ opens. As soon as the piston $d$ begins its back motion the valves $u$ and $v$ open to a certain degree and petroleum enters into the vessel T and air into the cylinder A. After the piston $d$ has accomplished a certain part of its back motion the bracket $d'$ leaves the triangle $w$ and the weight $g$ drops and opens the valve $v$ to its full size, thereby stopping the supply of petroleum into the vessel T. Thus the governor, by moving the triangle $w$, regulates as well the amount of petroleum as the amount of air supplied for each stroke into the combustion-cylinder C, thereby regulating the speed of the motor. When the piston P moves back, the exhaust-gases, by passing through the coiled tracks $r\,r$, impart their heat to the regenerator before leaving the combustion-cylinder C. Whenever the motor has worked awhile and the combustion-cylinder is heated, it is not necessary to use any artificial means for igniting the fuel, as the walls of the groove $e$ and those parts of cylinder and piston forming and inclosing the combustion-chamber are so hot as to ignite any fuel coming into contact with them; but in starting the motor, and as long as the combustion-cylinder is relatively cold, any artificial ignition of the fuel, as is well known in gas and petroleum motors, may be applied. I prefer to ignite the fuel in a very simple way by heating the pipe $f$ near its entrance into the combustion-cylinder from outside by means of the flame of any common lamp, the pipe $f$ being very small and easily getting red-hot. The air for igniting the fuel may be supplied through valves $f'$ and $f^2$ into the pipe $f$.

Whenever the valve $b$ is connected to a device for regulating the amount of air to be supplied into the combustion-cylinder C, as is described above and shown in the drawings, it is not necessary to provide the cylinder A with a slot $s$, the valve $v$ allowing the air to escape from as well as to enter into the cylinder A as long as desirable. In case gas is used instead of a liquid fuel, I provide the motor with a gas-pump, which may be constructed just like the air-pump shown in the drawings and described above, only without having a slot $s$, and being smaller in proportion than the air-pump. The gas-suction valve of the gas-pump is connected to a gas-supply pipe and to a device regulating the amount of gas to be delivered through the gas-discharge valve of the gas-pump into the combustion-cylinder by means of an inlet and pipe $f$.

The device for regulating the amount of gas supplied into the combustion-cylinder may be like the device shown for regulating the amount of air, or the same device may be used by proper connections to regulate both the amount of air and the amount of gas to be supplied into the combustion-cylinder.

It is understood that the gas-suction valve of the gas-pump is connected to the gas-supply pipe in such a way as to prevent any loss of gas, the gas escaping out of the gas-pump through its suction-valve always going back into the supply-pipe.

In order to diminish the size of the cylinders of the air and gas pump, motion may be transmitted in some other way to their pistons from the crank-shaft S, or each pump may be provided with valves, the motion of which depends on the motion of the crank-shaft S. I prefer the device shown and described above, especially in motors of a moderate size, as being very simple and involving only a small loss of power.

In the petroleum-motor two air-pumps may be used, one for supplying air into the annular space $z$ and another one to cause the supply of liquid fuel into the combustion-cylinder—a combined air and petroleum pump. A common small pump might be used to introduce the liquid fuel into the combustion-cylinder. I prefer the combined air and petroleum pump, as preventing any loss of fuel, the air removing all petroleum out of the pipe $t$, valve $u'$, and pipes $t'$ and $f$, from where it would otherwise evaporate when the gases exhaust out of the combustion-cylinder C.

Instead of a plunger-piston, a common piston may be used, carrying a prolongation which takes the place and has the same function as the prolonged plunger-piston. I prefer the last.

The regenerator is only to be considered as the enlarged surface of either the combustion-cylinder or its piston. I prefer to put the regenerator within an annular space between the inner surface of the cylinder and the prolonged piston, the same air first cooling the packing of the piston, then becoming heated within the generator, and afterward promoting combustion of the gas. I prefer a regenerator in the shape of coiled tracks, as it forces the air to circumflow several times the piston and to come in contact with a large surface. The coiled tracks may be a part of either the prolonged piston or the cylinder.

I prefer to put the crank-shaft S before the closed end of the combustion-cylinder, as shown in the drawings. It is not absolutely necessary to line the inner surface of the combustion-cylinder and one part of its prolonged piston with some fireproof material; but it is preferable, as the fireproof material prevents the cylinder and piston from becoming destroyed by the heat.

I do not limit myself to the use of the slide-valve $h$ and the device shown for its operation. Some other valve may be used, and this other valve or the slide-valve $h$ may receive its motion from the crank-shaft S by means of an eccentric or cam or some other mechanism.

I do not limit myself to the use of the device for regulating the speed as shown. Very different mechanism may be used for changing the amount of air and fuel to be delivered into the combustion-cylinder, thereby regulating the speed of the motor.

Having fully described my invention, what I desire to claim and secure by Letters Patent is—

1. In a motor a combustion-cylinder provided with a prolonged piston, surrounded by spiral grooves forming a regenerator, and communicating with an air inlet and an exhaust-port, substantially as and for the purpose specified.

2. In a motor a combustion-cylinder provided with a prolonged piston surrounded by a spiral groove or grooves forming a regenerator, and also surrounded by an annular space which is filled with cold air and which space is situated between the packing of the piston and the regenerator, substantially as specified.

3. In a motor one part of the combustion cylinder forming a combustion-chamber which is lined with fireproof material, combined with another part of said cylinder which is occupied by a piston, by an annular space between said piston and the inner surface of the cylinder and by a regenerator placed within said annular space and surrounding said piston.

4. In a motor an air-pump and a fuel pump with a piston common to both pumps, provided with an air suction-valve $v$, a fuel suction-valve $u$, and a discharge valve $u'$ communicating with a combustion cylinder; substantially as specified.

5. In a motor a combustion cylinder communicating with an air-pump and a fuel-pump both pumps having a piston in common, provided with an air-escape valve controlled by the governor; substantially as specified.

6. In a petroleum-motor in communication with an air-pump and an apparatus for the supply of liquid fuel, a combustion-cylinder provided with a prolonged piston surrounded by a regenerator and an annular space filled with cold air separating the packing of the piston from the hot air and gases of the regenerator.

7. In a motor a combustion cylinder provided with an air-valve or inlet and an inlet for the fuel, an exhaust-port, and a prolonged piston surrounded by a regenerator and an annular space filled with cold air separating the packing of the piston from the hot air and gases within the regenerator.

8. In a motor the combustion-cylinder provided with an air-inlet and an inlet for the fuel, an exhaust-port and inclosed grooves forming a regenerator and directing the flow of the entering air and the exhausting gases.

9. In a motor the combustion-cylinder provided with an air-inlet an inlet for the fuel, an exhaust-port, and a piston surrounded by grooves forming a regenerator and directing the flow of the entering air and the exhausting gases.

10. In a motor the combustion-cylinder provided with an air-inlet, an inlet for the fuel, an exhaust-port, and a prolonged piston; the air-inlet and the exhaust-port leading respectively into and out of an annular space between said prolonged piston and the inner surface of the combustion cylinder, thereby directing the flow of the entering air and the exhausting gases through said annular space for utilizing its inclosures as a regenerator.

11. In a motor an air pump, a fuel pump and a combustion-cylinder provided with a piston, a fuel inlet, an air inlet and an exhaust-port; the air inlet and the exhaust-port leading respectively into and out of an annular space between said piston and the inner surface of the combustion-cylinder.

12. In a motor the combustion-cylinder provided with an air inlet, an inlet for the fuel, an exhaust port and a piston surrounded by an annular space and by a regenerator which is placed within said annular space between the piston and the inner-surface of the cylinder.

HENNING FRIEDRICH WALLMANN.

Witnesses:
 JULIUS GUENTERT,
 W. F. HORN.